United States Patent
Bartel et al.

(10) Patent No.: US 11,499,320 B2
(45) Date of Patent: *Nov. 15, 2022

(54) STRUCTURAL SIDING PANEL WITH IMPROVED THERMAL AND MECHANICAL PROPERTIES

(71) Applicant: Tundra Composites, LLC, White Bear Lake, MN (US)

(72) Inventors: Adam Bartel, St. Paul, MN (US); Scott Bohnen, Stillwater, MN (US); Kurt Heikkila, Marine on the Saint Croix, MN (US); Michael Deaner, Osceloa, WI (US)

(73) Assignee: Tundra Composites, LLC, White Bear Lake, MN (US)

( * ) Notice: Subject to any disclaimer, the term of this patent is extended or adjusted under 35 U.S.C. 154(b) by 213 days.

This patent is subject to a terminal disclaimer.

(21) Appl. No.: 16/788,297

(22) Filed: Feb. 11, 2020

(65) Prior Publication Data
US 2021/0246665 A1    Aug. 12, 2021

(51) Int. Cl.
| | |
|---|---|
| *E04F 13/16* | (2006.01) |
| *B29C 48/00* | (2019.01) |
| *E04F 13/08* | (2006.01) |
| *B29L 31/10* | (2006.01) |
| *B29K 27/06* | (2006.01) |
| *B29K 309/08* | (2006.01) |

(52) U.S. Cl.
CPC .......... *E04F 13/165* (2013.01); *B29C 48/022* (2019.02); *E04F 13/0889* (2013.01); *B29K 2027/06* (2013.01); *B29K 2309/08* (2013.01); *B29L 2031/10* (2013.01)

(58) Field of Classification Search
None
See application file for complete search history.

(56) References Cited

U.S. PATENT DOCUMENTS

| | | |
|---|---|---|
| 4,033,802 A | 7/1977 | Culpepper, Jr. et al. |
| 5,352,154 A | 10/1994 | Rotter et al. |
| 5,475,963 A | 12/1995 | Chelednik |
| 5,706,621 A | 1/1998 | Pervan |
| 5,894,700 A | 4/1999 | Sweet |
| D450,138 S | 11/2001 | Barber |
| 6,321,500 B1 | 11/2001 | Manning et al. |
| D471,292 S | 3/2003 | Barber |
| 6,526,718 B2 | 3/2003 | Manning et al. |
| 6,627,017 B2 | 9/2003 | Simpson |
| 6,981,348 B2 | 1/2006 | Kjorsvik |
| 7,921,537 B2 | 4/2011 | Rodlin |
| 10,544,578 B2 | 1/2020 | DeBuff |
| 10,557,272 B1* | 2/2020 | Moses, Jr. ............... B32B 3/30 |
| 2003/0131551 A1 | 7/2003 | Mollinger et al. |
| 2016/0002468 A1* | 1/2016 | Heikkila ............... C08L 97/02 524/13 |
| 2019/0194462 A1* | 6/2019 | Heikkila .................... C08J 5/06 |
| 2021/0348395 A1* | 11/2021 | Heikkila ................. C08K 7/14 |

* cited by examiner

Primary Examiner — Joshua K Ihezie
(74) Attorney, Agent, or Firm — Mark J. DiPietro; Fred C. Morgan

(57) ABSTRACT

An advanced siding panel that combines a traditional siding appearance with improved insulation, structural integrity, and improved thermal characteristics.

10 Claims, 8 Drawing Sheets

STRUCTURAL SIDING PANEL WITH IMPROVED THERMAL AND MECHANICAL PROPERTIES

FIELD

An advanced siding panel that combines a siding profile appearance with improved structural integrity, and improved thermal characteristics.

BACKGROUND

Vinyl extruded siding materials has been made for many years. Companies have made unbacked unreinforced vinyl siding and backed vinyl siding for some years. Such siding has been used in new construction and renovation as exterior cladding for domestic and commercial structures. Vinyl siding is relatively inexpensive and can be easily installed and maintained. The value of the siding is based on appearance, thermal and mechanical stability, and impact strength.

In other words, once installed, these siding panels should take the appearance of a conventional siding profile décor. Overlapping between edges adjacent panels are not readily apparent and the appearance of the panel with improved shadow lines and crisp panel characteristics does not change after installation. The siding should provide thermal and mechanical stability such that extremes of heat does not affect appearance and day to day wear and tear from transportation installation and use does not degrade the look of the materials. Lastly, impact resistance is one unique and important mechanical aspect. Reducing the harmful effects of hail and other natural and man-made projectiles with substantial energy have become more important. Many energetic projectile-like objects can dent, chip, and dislodge siding units.

A substantial need exists in this industry to obtain a siding panel that provides a look substantially identical to that of common conventional siding profile installations and maintains its sophisticated and conventional look, but is made in standard sizes and in profile shapes and sizes that can be easily transported and installed. While conventional siding members find substantial utility in current residential and commercial real estate applications, the materials can be improved. A substantial need exists for a siding panel the obtains aesthetic appearance, improved thermal and mechanical stability, and impact strength.

BRIEF DESCRIPTION

Briefly, the claimed siding structure includes an extruded fiber-reinforced polymer panel with a siding profile and a reinforced insulating backing material substantially adhered to the reverse surface of the panel forming a panel structure that can be easily transported and installed but maintain sophisticated and attractive appearance along with insulation value, thermal and mechanical stability, and impact strength.

The claimed structure can be manufactured by first forming a composite of interfacial modified (IM) coated glass fiber combined with a thermoplastic polymer, extruding that material with minimal or no drawdown into the form of a siding profile member and then combining that siding member with a reinforcing and insulating backing.

We have found that a substantially improved siding panel can be made with the appearance of at least two conventional installed siding profile members. The claimed structure has a nailing flange, a length and width that lends itself to ease of transportation and installation. The claimed structure includes a profile formed from a thermoplastic composite. The claimed structure additionally comprises a top edge and a bottom edge that can cooperate to provide a continuous installation of an arbitrarily large number of panels enough to cover a residential or commercial structure. Lastly, the reinforcing insulating panel adhered to and substantially cover the reverse side of the claimed siding structure. An extruded fiber-reinforced polymer panel with a siding profile forming a panel structure can be formed that can be easily transported and installed but maintains sophisticated and attractive appearance along with thermal and mechanical stability, impact strength.

The claimed structure can be manufactured by first forming a composite of interfacial modified coated glass fiber combined with a thermoplastic polymer, forming that material into the form of a siding profile siding member.

A "siding panel" assembly comprises a continuous composite siding profile comprising a top edge comprising a nailing flange and a bottom edge, an exterior face and a reverse face, and a right and a left installation locus for adjacent panels. The panel provides an installation surface on the reverse portion of the panel assembly. The panel comprises a composite comprising a continuous thermoplastic polymer and an interfacial modifier coated glass fiber phase dispersed in the polymer. The composite comprising glass fiber, the fiber having a length greater than about 5 microns, a diameter greater than about 3 microns and an aspect ratio greater than about 3, the fiber having about 0.1 to 5 wt. % of an exterior coating comprising an organometallic interfacial modifier, the wt. % based on the discontinuous phase or fiber phase. The continuous polymer phase comprises a thermoplastic polymer. The siding, because of the advance glass fiber composite, has improved thermal and mechanical stability. This stability is reflected in its heat deflection temperature of at least 60° C. (ASTM D648), and a COTE of less than $20 \times 10^{-6}$ in·in$^{-1}$·F° (ASTM 696). nailing flange and the vertical course connections with the flat reverse installation surface obtains a reliable, secure installation that can resist environmental and day to day wear and tear.

The term "siding profile" means an extruded member with an appearance that mimics or resembles a common conventional siding look and feel. Included in such profiles are structures that can have grained or un-grained appearances, painted and stained clapboards, painted and stained shingle siding, slate siding, brick or other ceramic siding and others that can be embossed or thermoformed into the thermoplastic.

The term "reverse face" means the face of the siding that faces the rough building exterior.

The term "exterior face" means the face opposite the reverse face that is exposed to the environment.

The term "top edge" mean a substantially linear edge extending along the top of the siding substantially parallel to the ground. The term "bottom edge" mean a substantially linear edge extending along the bottom of the siding substantially parallel to the ground.

The term "nailing flange" is a strip with apertures for fasteners that is integral to an edge or added onto the profile. Such a flange is typically added to the top edge.

The term "installation surface" means a substantially planar surface the is sized and configured to match the substantially planar rough exterior of a building.

The term "installation locus" means a surface of a construction that can support overlapping additional siding installed thereon.

The term "clapboard profile" means the appearance of a conventional installed clapboard siding application with one, two or three courses of clapboards in a polymer siding member, The term "thermally stable" indicates that the thermoplastic materials that make up the siding do not change under the influence of heat such that the profile departs from its original profile shape or form gaps between overlapping siding panels.

The term "mechanical stability" refers to the ability of the installed panel to substantially reduce the impact of forceful objects on the panel that could otherwise cause cosmetic and structural damage.

The term "interfacial modifier" (IM) means a material that can coat the surface of fiber and does not react or interact with the polymer or other coated fiber present in the composite.

DETAILED DISCLOSURE

Figure 1:
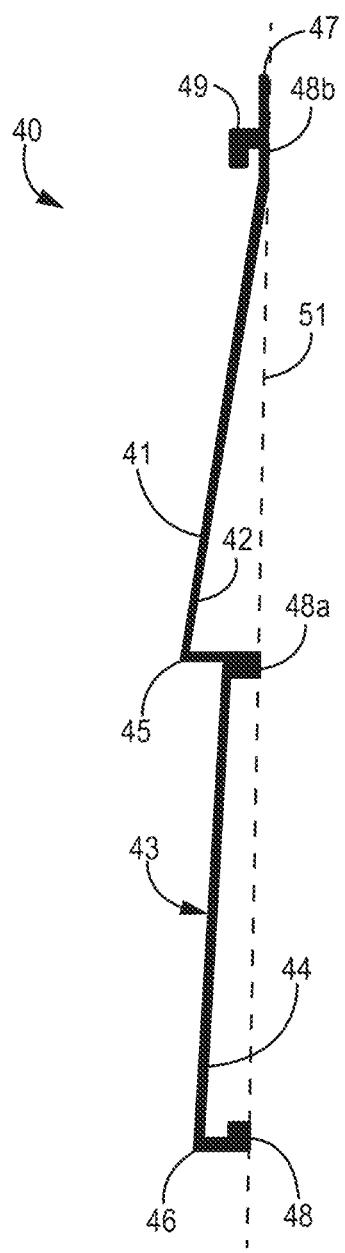
FIG. 1 is a side view of an aspect of the panel siding structure as claimed.

A siding panel assembly comprises a continuous composite siding profile and a reinforcing insulation member. The profile comprising a top edge comprising a nailing flange and a bottom edge, an exterior face and a reverse face, and a right and a left installation locus for adjacent panels. The reinforcing insulation substantially covers the reverse face of the siding panel. A reinforcing insulation member fitting the reverse side of the siding profile such as a clapboard profile or overlapping beveled profile siding members provides a substantially planar installation surface on the reverse portion of the panel assembly. an exterior coating comprising an interfacial modifier. The continuous polymer phase comprises a thermoplastic polymer.

The siding, because of the advanced coated glass fiber composite, has improved thermal and mechanical stability. Mechanical stability is reflected in impact properties as measured by ASTM D256 and the tensile and flexural properties as measured by ASTM D638 and D790. Thermal stability is reflected in its heat deflection temperature of at least 60° C. (ASTM D648), and a COTE as in·in$^{-1}$·F° (ASTM 696).

Composites of the embodiments are made by combining an interfacially modified or coated fiber with a thermoplastic polymer. The claimed material is made from chopped fiber or a collection of substantially parallel fibers such as a yarn or tow. Chopped fiber is commercially available. Chopped materials are made by first extruding glass fiber and chopping the fiber into lengths as needed.

A glass yarn or tow is collection of substantially continuous, unentangled, parallel, structural fibers, each oriented in substantially parallel direction. The fiber is derived from a plurality of threads, one or more yarns or one or more tows as those terms are understood in the industry. A plurality of individual fibers is sorted, uniformly spread and then dispersed into a polymer. The fibers can be directed through an extruder head and is combined with polymer in the melt phase to form a layer of fiber coated by or dispersed in polymer.

The chopped or continuous fiber, yarn, or tow reinforcing material of the claimed composite can comprise any inorganic or organic yarn, fiber, or tow that exhibits substantial tensile strength in the fiber and substantial physical properties in the composite even at elevated temperatures. Such yarns, or tows are substantially multi-filament assemblies of fibers having 500 or more fibers and can have up to 20,000 fibers. Such yarns or fibers are typically produced by heating precursor material into a melt and then spinning the fibers through small diameter orifices. The spun fibers can then be taken up with spools, bobbins, reels, or other form that can contain a large indeterminate length or quantity of the manufactured fiber. Once formed the fiber can be chopped to a desired size(s).

The specific choice of the fiber is governed by the environment of the intended use. In applications strength, stiffness, impact strength, and toughness can be engineered for each individual use. Different structural requirements which can be engineered as needed. The properties can be obtained by varying the fiber content, fiber diameter, composite, and dimensions and polymer or thermoplastic content. Further, the type of fiber can have a significant impact on the ultimate physical properties of the composite. Useful fibers include natural and synthetic fibers. Natural fibers include cellulosics, such as wood fibers and cotton and proteins such as wool or silk. Synthetic fibers include inorganic and organic materials. Inorganic include ceramics, carbon, metals and glass fibers. Organic fibers are typically polymeric materials such as acrylics, polyester, nylon, polyolefin etc.

The coated glass fiber is particularly useful in manufacturing the composites in the invention are compatible with the thermoplastic material in the sense that they are chemically inert and have surface characteristics that do not prevent wet out of the polymer onto the IM coated glass surface. Further, the fiber material should have a coefficient of thermal expansion that is not substantially dissimilar from the polymer matrix.

In making the composite as claimed, the reinforcing fiber typically dispersed within a thermoplastic matrix at proportions set to obtain the desired structural and thermal properties in the composite as required by the end use of the composite material. See tables 1-4 below for materials proportions.

The composite materials, in a final structural article can obtain thermal and mechanical stability, including improved coefficient of thermal expansion (COTE), and resistance to deformation and impact resistance, stiffness, and tensile and flexural stability. This gives the ability to adapt the composite to the specific structural characteristics of the final product installed on a surface containing multiple parts made from the composite. Such parts can be combined using a variety of mechanical, adhesive, and thermal construction techniques. The composites of the claimed materials begin with processing a plurality of the fiber from a tow or yarn, preparing the fiber tow or yarn in an arrangement of the fibers in a longitudinal substantially planar array, combining the substantially longitudinal planar and parallel array with a thermoplastic material to form a substantially uniform web of parallel fibers dispersed in a polymer matrix.

Interfacial Modifier (IM)

An interfacially modified coating is a substantially complete coating of an interfacial modifier (IM) with a thickness of less than 1000 Angstroms often less than 200 Angstroms, and commonly 10 to 500 Angstroms (Å). An interfacial modifier is an organo-metallic material that provides an exterior coating.

An interfacial modifier is an organic material, in some examples an organo-metallic material Interfacial modifiers fall into broad categories including, for example, titanate compounds, zirconate compounds, hafnium compounds, samarium compounds, strontium compounds, neodymium compounds, yttrium compounds, boron compounds, cobalt compounds, phosphonate compounds, aluminate compounds and zinc compounds. Aluminates, phosphonates, titanate and Zirconate that are useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. In embodiments, the titanate and zirconate contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand.

In one embodiment, the interfacial modifier that can be used is a type of organo-metallic material such as organo-cobalt, organo-iron, organo-nickel, organo-titanate, organo-boron, organo-aluminate organo-strontium, organo-neodymium, organo-yttrium, organo-zinc or organo-zirconate. The specific type of organo-titanate, organo-aluminates, organo-strontium, organo-neodymium, organo-yttrium, organo-cobalt, organo-zirconate which can be used, and which can be referred to as organo-metallic compounds are distinguished by the presence of at least one hydrolysable group and at least one organic moiety. Mixtures of the organo-metallic materials may be used.

Certain of these types of compounds may be defined by the following general formula:

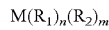

$M(R_1)_n(R_2)_m$ wherein M is a central atom selected from such metals as, for example, Ti, Al, Hf, Sa, Sr, Nd, Yt, B, Co, P, Zn, and Zr and other metal centers; $R_1$ is a hydrolysable group; $R_2$ is a group consisting of an organic moiety, preferably an organic group that is non-reactive with polymer or other film former; wherein the sum of m+n must equal the coordination number of the central atom and where n is an integer ≥1 and m is an integer ≥1. Particularly $R_1$ is an alkoxy group having less than 12 carbon atoms. Other useful groups are those alkoxy groups, which have less than 6 carbons, and alkoxy groups having 1-3 C atoms. $R_2$ is an organic group including between 6-30, preferably 10-24 carbon atoms optionally including one or more hetero atoms selected from the group consisting of N, O, S and P. $R_2$ is a group consisting of an organic moiety, which is not easily hydrolyzed and is often lipophilic and can be a chain of an alkyl, ether, ester, phospho-alkyl, phospho-alkyl, phospho-lipid, or phospho-amine. The phosphorus may be present as phosphate, pyro-phosphato, or phosphito groups. Furthermore, $R_2$ may be linear, branched, cyclic, or aromatic. $R_2$ is substantially unreactive, i.e. not providing attachment or bonding, to other objects or fiber within the composite material. Titanates provide antioxidant properties and can modify or control cure chemistry. The appropriate interfacial modifier for the entire object, to ensure compatibility with polymer materials used in paints, films, fibers, and tapes, can be determined by measuring the viscosity of the materials during and after manufacture.

The use of an interfacial modifier results in workable viscosity for the fiber components. Minimal amounts of the modifier can be used including about 0.005 to 8 wt.-%, about 0.01 to 6 wt.-%, about 0.02 to 5 wt.-%, or about 0.02 to 3 wt. %. The IM coating can be formed as a coating of at least 3 molecular layers or at least about 50 or about 100 to 500 or about 100 to 1000 angstroms (Å).

The glass fiber useful as reinforcing fiber includes several commercially available types of fiberglass, e.g. types of fiberglass, e.g. types A, C, D, E, Zero Boron E, ECR, AR, R, S, S-2, N, and the like. These fibers are characterized in having a tensile modulus enough to act as a structural component. Many have a tensile modulus in the range of from $10-14\times10^6$ psi or more if necessary, and an elongation at break of not greater than about 3%. The fiber is typically in the form of a collection of individual threads, a multi-fiber yarn or tow. The fiber is obtained in large units and often comes as a wrapped fiber in a spool or other form.

Silica forms another useful fiber and comprises a glass fiber known by the designations: A, C, D, E, Zero Boron E, ECR, AR, R, S, S-2, N, and the like. Generally, any glass that can be made into fibers either by drawing or spinning processes used for making glass fibers. Such fiber is typically used as a length of about 50 mm to approaching kilometer sizes, a diameter about 0.8-100 microns and an aspect ratio (length divided by diameter) greater than 90 or greater than about 100. When chopped, the lengths are about 0.8 to 200 mm. These aspect ratios are typical if the input is to the compounder. After pellets are formed the aspect ratio is set by the pellet dimensions.

These commercially available fibers are often combined with a sizing coating. Such coatings cause the otherwise ionically neutral glass fibers to form into and remain in bundles or fiber aggregates. Sizing coatings are applied during manufacture before gathering. The sizing minimizes filament degradation caused by filament to filament abrasion in the aggregate. Sizings can be lubricants, or reactive couplers but do not act as an interfacial modifier or contribute to the structural or thermal properties of a composite using an interfacial modifier (IM) coating on the fiber surface. The glass fibers employed in the claimed embodiments include glass fibers available commercially.

Thermoplastic Polymer

A large variety of thermoplastic polymer and copolymer materials can be used in the composite materials. We have found that polymer materials useful in the composite include both condensation polymeric materials and addition or vinyl polymeric materials.

Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water, methanol or some other simple, typically volatile substance. Such polymers can be formed in a process called polycondensation. The typical polymer has a density of at least 0.85 gm-cm$^{-3}$, however, polymers having a density of greater than 0.96 are useful to enhance overall product density. A density is often 0.94 to 1.7 or up to 2 gm-cm$^{-3}$ or can be about 0.96 to 1.95 gm-cm$^{-3}$.

Useful vinyl polymers include polyacrylonitrile; polymer of alpha-olefins such as ethylene, propylene, etc.; polymers of chlorinated monomers such as vinyl chloride, vinylidene chloride, acrylate monomers such as acrylic acid, methyl acrylate, methyl methacrylate, acrylamide, hydroxyethyl acrylate, and others; styrenic monomers such as styrene, alpha-methyl styrene, vinyl toluene, etc.; vinyl acetate; and other commonly available ethylenically unsaturated monomer compositions. Examples include polyethylene, polypropylene, polybutylene, acrylonitrile-butadiene-styrene (ABS), polybutylene copolymers, polyacetal resins, polyacrylic resins, homopolymers, etc. Useful polymers are halogen polymers such as homopolymers, copolymers, and blends comprising vinyl chloride, vinylidene chloride, fluorocarbon monomers, etc. Polyvinyl chloride polymers with a K value of 50-75 can be used. A characteristic of the PVC resin is the length or size of the polymer molecules. A measure of the length or size is molecular weight of PVC. A useful molecular weight can be based on measurements of viscosity of a PVC solution. Such a K value ranges usually between 35 and 80. Low K-values imply low molecular weight (which is easy to process but has properties consistent with lower polymer size) and high K-values imply high molecular weight, (which is difficult to process, but has properties consistent with polymer size). The most commonly employed molecular characterization of PVC is to measure the one-point-solution viscosity. Expressed either as inherent viscosity (IV) or K-value, this measurement is used to select resins for the use in extrusion, molding, as well as for sheets, films or other applications. The inherent viscosity (IV) or K-value is the industry standard (ISO 1628-2) starting point for designing compounds for end use. Polymer solution viscosity is the most common measurement for further calculation of inherent viscosity or the K-value, because it is an inexpensive and routine procedure that can be used in manufacturing as well as in R&D labs. For example, a Lovis® 2000 M/ME micro-viscometer can measure polymer solution viscosity and set K value.

Typically, the composite materials of the invention are manufactured using melt processing. A typical thermoplastic polymer material is combined with fiber and processed until the material attains substantial uniformity. In the claimed materials, the fibers are coated or treated with IM before melt processing with polymer to obtain the ease of processing and physical properties needed. Once coated, the fiber exterior appears to be the IM composition while the fiber silica character is hidden. The organic nature of the coating changes the nature of the interaction between the fiber surface and the polymer phase. The silicate surfaces of the fibers are of a different surface energy and hydrophobicity than the polymer or coating. The polymer does not easily associate with the inorganic fiber surface, but much more easily associates with the organic nature of the coated surface of the inorganic fiber. The coated fiber mixes well with the polymer and can achieve greater composite uniformity and fiber loadings. Typically, a pellet is extruded and is then melt formed into sheet form. The composite sheet, thus, obtains improved physical properties such as notched IZOD impact strength (ft-lb-in$^{-1}$) (ASTM D256), tensile strength (lb-in$^2$), modulus (lb. ×10$^6$-in$^{-2}$) and elongation (%) (ASTM D638/D3039) flexural strength (lb-in$^2$) and modulus (lb. ×10$^6$-in$^{-2}$) at elevated temperature (ASTM 790), and coefficient of thermal expansion (in-in$^{-1}$-° F.) (COTE-ASTM 696). Such properties are seen over a range of environmental temperatures.

The composite can be used to make a pellet or directly into the profile. Such a pellet made of the composite can be used as an intermediate between the compounding of the composite and the manufacturing of the final product. Such a pellet can comprise the composite comprising the components in use concentration of components designed to be directly converted or used in making a useful article. Alternatively, the pellet can comprise a master batch composition with increased amounts, e.g., about 2 to 10 times the amount of fiber such that the pellet can be combined with polymer in proportions that result in producing useful concentrations. The pellet is a roughly cylindrical object that can be fed into an extruder input. The pellet is typically 1 to 10 mm in height and 1 to 10 mm in diameter.

The composite can be used to make an article of manufacture including an extruded siding. Siding can be made directly from the polymer/fiber compounding process or can be made from a pellet comprising polymer/fiber input. Articles can include pellets used in further thermoplastic processing, structural members, or other articles that can be made using thermoplastic processing such as injection molding, compression molding, etc.

Briefly the process of forming the siding panel begins with the extrusion of the composite material into a sheet of composite material. Such a sheet can be formed from a pellet or directly from a compounding extruder wherein the coated fiber and polymer are combined into a substantially well-dispersed composite of fiber dispersed within a polymer matrix. Once the uniform dispersion is formed then the composite can then be extruded from the compounder. At this stage, the composite can either be directly formed into a useful sheet by directing the composite through a sheeting die. Alternatively, the compounded composite can be formed into a pellet structure and stored for future processing. The composite, in pellet form, can then be directed into a production extruder wherein it is melted and then forced through a sheet-like aperture or die forming the useful sheet that can be later formed into a profile structure. Such a sheet is about 1 mm in thickness and usually indeterminate in length, depending on the amount of material that can be used but is typically made in widths that range from about 10 to about 20 in. or 25 to about 50 cm.

Once extruded, and while still warm, the sheet like material is then subject to a process called drawdown. In this, the sheet or panel is stretched or drawn increasing its length and reduce its thickness by less than 10% or less than 5%. Such a stretching process tends to align the glass fibers increasing its tensile and flexural properties in the aligning direction but also adds to the improved economic status of the product since an increased length results in improved productivity. In the manufacture of conventional vinyl siding materials, a thermoplastic polymer such as polyvinyl chloride is extruded at an appropriate melt temperature to form typically a sheet-like panel. The panel is typically conveyed to a station wherein using high pressure heated rollers, a siding profile is imposed into the warm plastic after extrusion to produce the profile appearance including wood grain or other outward appearance such as a brick appearance, cedar siding appearance etc. In this process step, the panel either before or after forming the profile in the warm plastic, the plastic sheet is often stretched substantially along the extrusion direction thus increasing productivity of the siding materials. Such a process often involves introducing nailing flanges, and post-processing formation of apertures for installation or other aspects required for either the manufacturer or the transportation or installation of the siding products onto a rough surface. In these conventional processes, the process in which the material is stretched and extended increases productivity but also decreases the thickness of the panel.

The various aspects of the claimed panels combine an interfacially modified coated glass fiber and polyvinyl chloride in a composite material. The panels can be made directly from an extruder as the composite material is formed or the composite material can be formed into a pellet which can be accumulated and inventoried. Once the inventory of pellet is enough, the panels can be made by extruding the pellets at an appropriate melt temperature to form the panels which are then processed into the siding profiles. In the extrusion of the glass polymer composite, the glass fibers tend to be oriented in the direction of the extrusion flow such that the length of the glass fiber is parallel to the flow of the plastic composite as it exits the extruder in both the panel formation and the pellet forming processes.

As a result, the new resulting formed panel or profile develops substantial tensile strength in the direction of the flow since the fibers are parallel to the flow and resist the stretch. extension of the panel or profile after formation above a certain loading of fiber in the polymer materials. And as a result, the glass cover composite materials cannot be subject to any substantial stress to extend the material or increased productivity, the material is simply extruded and then formed into the appropriate siding profile without any substantial lengthening extension or draw down of the composite sheet or profile. If the tensile nature of the sheet or panel is overcome the siding product can be damaged.

When the final length is established, then the sheet can be then further formed or processed into the profile appearance or structure. In such processing the panel can be formed typically using dies such as compression or roller dies into the siding appearance or profile desired such as a clapboard structure, a brick-like structure, a slate siding type structure or other common siding profile appearances. Additionally, and in no order, the sheet-like material can also be processed to introduce into the surface of the sheet a wood grain, a brick texture, a slate-like texture, or other textures common in typical commercial or residential siding panels.

In the manufacture of conventional vinyl siding materials, a thermoplastic polymer such as polyvinyl chloride is extruded at an appropriate melt temperature to form typically a sheet-like panel. The panel is typically conveyed to a station wherein using high pressure heated rollers, a siding profile is imposed into the warm plastic after extrusion to produce the profile appearance including wood grain or other outward appearance such as a brick appearance, cedar siding appearance etc. In this process step, the panel either before or after forming the profile in the warm plastic, the plastic sheet is often stretched substantially along the extrusion direction thus increasing productivity of the siding materials. Such a process often involves introducing nailing flanges, and post-processing formation of apertures for installation or other aspects required for either the manufacturer or the transportation or installation of the siding products onto a rough surface. In these conventional processes, the process in which the material is stretched and extended increases productivity but also decreases the thickness of the panel.

The various aspects of the claimed panels combine an interfacially modified coated glass fiber and polyvinyl chloride in a composite material. The panels can be made directly from an extruder as the composite material is formed or the composite material can be formed into a pellet which can be accumulated and inventoried. Once the inventory of pellet is enough, the panels can be made by extruding the pellets at an appropriate melt temperature to form the panels which are then processed into the siding profiles. In the extrusion of the glass polymer composite, the glass fibers tend to be oriented in the direction of the extrusion flow such that the length of the glass fiber is parallel to the flow of the plastic composite as it exits the extruder in both the panel formation and the pellet forming processes.

As a result, the new resulting formed panel or profile develops substantial tensile strength in the direction of the flow since the fibers are parallel to the flow and resist the stretch. extension of the panel or profile after formation above a certain loading of fiber in the polymer materials. And as a result, the glass cover composite materials cannot be subject to any substantial stress to extend the material or increased productivity, the material is simply extruded and then formed into the appropriate siding profile without any substantial lengthening extension or draw down of the composite sheet or profile. If the tensile nature of the sheet or panel is overcome the siding product can be damaged.

The sheet-like material can be further processed to introduce into the sheet a nailing flange integral in the sheet or other structural aspects such as the connections formed in the top edge and the bottom edge to ensure that the end use siding can be mechanically fixed vertically by joining courses vertically installed onto a commercial or residential building structure. Other substructures useful in the siding can also be introduced with further processing at this stage. Lastly, the formed structure including the appropriate siding appearance connection structures and nailing flange can then be cut into appropriate lengths and widths needed for the final product.

Once the profile is complete, the structural insulating panel is then placed onto the reverse side of the profile covering substantially all the surface except for structure needed to be revealed for installation. The structural insulating panel is often adhered to the reverse side of the panel using common construction adhesives, including both pressure sensitive adhesives, curing adhesives such as polyurethanes or poly-epoxies or other adhesive technology.

Alternatively, the structural insulating panels can be fixed onto the reverse surface of the panel using fastener structures formed from the composite onto the profile during manufacture. Once the insulating structural panel is fixed onto the reverse side of the profile, any labeling or printed indicia can be introduced onto the reverse side of the siding indicating source of the product or its insulation value or installation directions. With the introduction of these labels or indicia, the manufacture of the siding panel is complete, and the panel can be packaged for storage delivery and installation.

Since this panel structure is intentionally designed to conform to the typical structure of conventional siding, it can be installed using known installation techniques wherein a starter course is typically formed at the base of an installation surface and then the full course is typically installed with overlapping siding panels. Onto the initially formed siding course is adhered a second course typically directly above the starting course by introducing the second siding panel in such a position that the connecting structures on the second panel installed above the starter course interacts with the connection structure in the starter course to form an integral siding double course structure. The second panel is then nailed using the nailing flange to complete the second course. Third, fourth, fifth, et cetera courses are then added serially until the rough surface of the commercial or residential structure is completely covered by the improved siding components.

Adjacent siding units can be installed with an overlapping fashion. This obtains a continuous installation of the insulation since the setback overlaps an adjacent siding to an extent that the siding unit to siding unit transition is smooth and continuous. This overlapping installation obtain a relatively smooth installation and as the installation weathers, keeps the edges of the siding substantially in contact with the overlapped siding underneath (minimal fish-mouthing) in the overlapped location. This setback and the resulting overlapped dimension should be at least 0.2 inches and can be as much as 1 inch or can be 0.3 to 0.8 inches.

Structural members include linear extrudates that can be mechanically milled or reinforced with secondary members. The article can be used as a siding member.

Table 1—Exemplary Composites

Representative Formulations for Polymer Glass Composites and other Variations

TABLE 1

| Polymer/glass fiber | | | | |
|---|---|---|---|---|
| Material | Wt. % | Vol. % | Wt. % | Vol. % |
| Polymer | 30-95 | 55-97 | 80-90 | 62-95 |
| Glass fiber | 5-70 | 3-45 | 88-94 | 4-40 |

TABLE 2

| Polymer/glass fiber/third component | | | | |
|---|---|---|---|---|
| Material | Wt. % | Vol. % | Wt. % | Vol. % |
| Polymer | 24-95 | 55-98 | 30-90 | 55-97 |
| Glass fiber | 1-24 | 1-10 | 4-12 | 2-7 |
| Fiber/particulate | 4-40 | 2-40 | 10-40 | 2-40 |

TABLE 3

| Polymer/glass fiber wollastonite | | | | |
|---|---|---|---|---|
| Material | Wt. % | Vol. % | Wt. % | Vol. % |
| Polymer | 23-95 | 55-98 | 30-90 | 55-97 |
| Glass fiber | 1-24 | 0.5-10 | 4-12 | 2-7 |
| Wollastonite | 4-52 | 2-35 | 10-37 | 2-30 |

TABLE 4

| Polymer/glass fiber/wood fiber | | | | |
|---|---|---|---|---|
| Material | Wt. % | Vol. % | Wt. % | Vol. % |
| Polymer | 45-95 | 55-97 | 50-95 | 50-90 |
| Glass fiber | 1-15 | 0.5-6 | 4-12 | 1-9 |
| Wood Fiber | 4-40 | 4-40 | 16-40 | 15-35 |

TABLE 2

| | | Typical properties | | |
|---|---|---|---|---|
| Property | ASTM Method | | | Units |
| Tensile Strength | D638 | 37-75 (5,300-10,900) | 40-68 (5,800-9,900) | MPa (psi) |
| Tensile Modulus | D638 | 3,174-14,897 (460,000-2,160,000) | 4,276-12,759 (620,000-1,850,000) | GPa (psi) |
| Flexural Strength | D790 | 72-142 (10,400-20,600) | 78-130 (11,300-18,800) | MPa (psi) |
| Flexural Modulus | D790 | 3,931-18,897 (570,000-2,740,000) | 5,379-16,206 (780,000-2,350,000) | GPa (psi) |
| Notched IZOD | D256 | 73.6-221 (1.38-4.15) | 88.6-195 (1.66-3.65) | $J \cdot m^{-1}$ (ft · lbs · $in^{-1}$) |
| COTE | D696 | $58-8.2 \times 10^{-6}$ ($32-4.56 \times 10^{-6}$) | $45-15.2 \times 10^{-6}$ ($25-8.44 \times 10^{-6}$) | $cm \cdot cm^{-1} \cdot °C$ (in · $in^{-1} \cdot °F$) |
| R | D1363 | <2 | <4 | |

Examples 1-3

Based on these formulations representative composites were made from commercial PVC compositions and were compounded on the 70 mm compounder at 10 wt %, 30 wt %, and 60 wt %. glass fiber the target throughput was 1000 lbs./hr.

Once compounded, the following tests were performed: HDT, COTE, notched Izod impact un-notched Izod impact, and Brabender torque rheometer. All materials were able to be compounded on the 70 mm #1 compounder without burning or visible degradation. The throughput was dropped to 600 lbs./hr. for the 10 wt % formulations in order to pelletize the stickier material and prevent it from agglomerating and clogging the current system. The Fiberloc 81500 material was dropped to 300 lbs./hr. for the 10 wt % formulation. The drop-in throughput was only necessary to accommodate our current system, which is tailored towards highly filled PVC composites. If desired, the system could be easily modified to consistently produce these products at higher throughputs, there just has not been the need. Both PVCs yielded lower torques and resulting SME, lower die pressures, and controlled melt temperature when compared to the AWS16 control. In order to control the compounding process, the screw speed is altered to target a melt temperature, which is why the melt temperatures are nearly identical.

Figure 6:
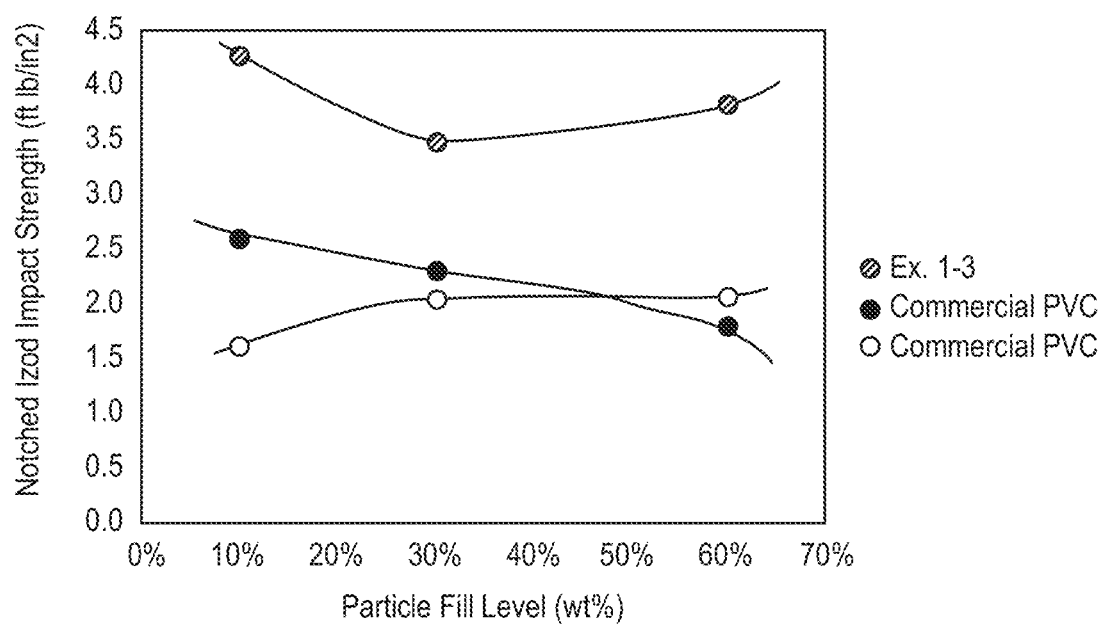
FIG. 6-8 are graphical representations of Izod impact strength (Izod), coefficient of thermal expansion (COTE) and heat deflection temperature (HDT).
Figure 7:
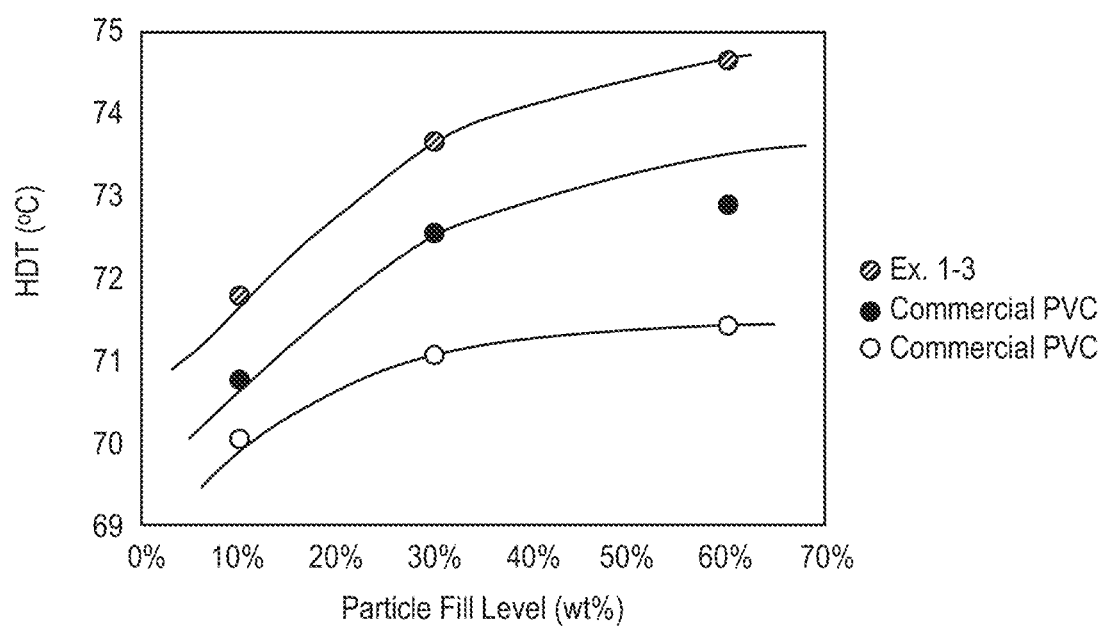
Figure 8:
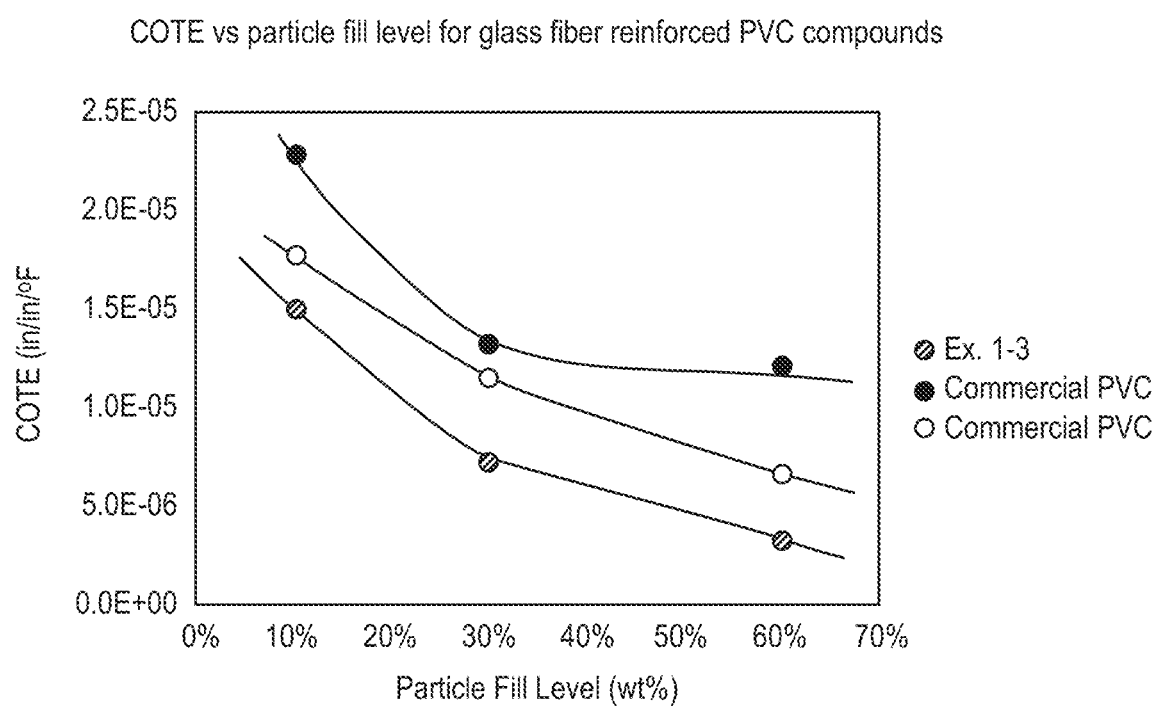

The coefficient of thermal expansion (COTE) and heat deflection temperature (HDT) and notched Izod impact are measured. COTE and HDT are significantly improved over polymer and with increased fiber loading as shown in FIGS. 7 and 8. The Izod impact strength is relatively consistent across all fiber loadings as seen in FIG. 6.

DETAILED DISCUSSION OF THE FIGURES

FIG. 1 is a side cross sectional view of the panel as claimed. FIG. 1 shows a cross-sectional side view of the siding structure. The siding structure 40 has improved thermal properties because of the combination of unique elements. The siding structure 40 combines the appearance of conventional siding materials, structural integrity, thermal integrity in a single unit that can be installed on a rough exterior in both real estate and commercial architecture. The siding structure 40 in this view, can take the appearance of overlapped cedar shake siding or a conventional clapboard siding depending on the view of the siding structure 40 from its appearance side. The siding structure 40, contains a front elevation 41 and 43 that is introduced into the siding structure 40 to mimic wood grain of a clapboard siding, overlapping shingles siding or stone siding as needed. Decorative edges 45 and 46 and front elevations 41 and 43 provide a pleasing appearance of a conventional siding structure Front elevation 41 and 43 can have formed in its surface wood grain characteristics (not shown), the appearance of stained natural wood or uniformly covered or varied stone colors and exterior profiles. The siding structure 40 further contains a reverse elevation 42 and 44, which is typically produced without substantial decorative relief sch as grain. In the installation of a siding structure 40 onto a rough exterior (not shown), the siding structure 40 is first placed on the rough exterior and then secured using fasteners that can be directed through the top attachment nailing flange, 47. While this flange is commonly called a nailing flange, any useful fastener that fits the flange apertures can be used in securing the siding structure 40 onto the rough surface 51 using the flange 47. Edge 48 cooperates with attachment 49 to obtain rigid installation of two or more courses of siding. Edge 48 48a and 48b cooperate to permit secure installation against the rough surface. 51.

Once placed on a rough exterior, additional siding structures can be added to the siding structure that has been secured on the rough surface using bottom and top continuation flanges 48 and 49.

At opposite ends of the panel 40 are right and left installation loci (not shown) that can be used to form a continuous surface of two or more of the siding structures in a side by side orientation. The use of the composite as claimed provides a stable thermal performance that minimizes any distortion of the edges that can expose the joinder of the panels.

Figure 2:
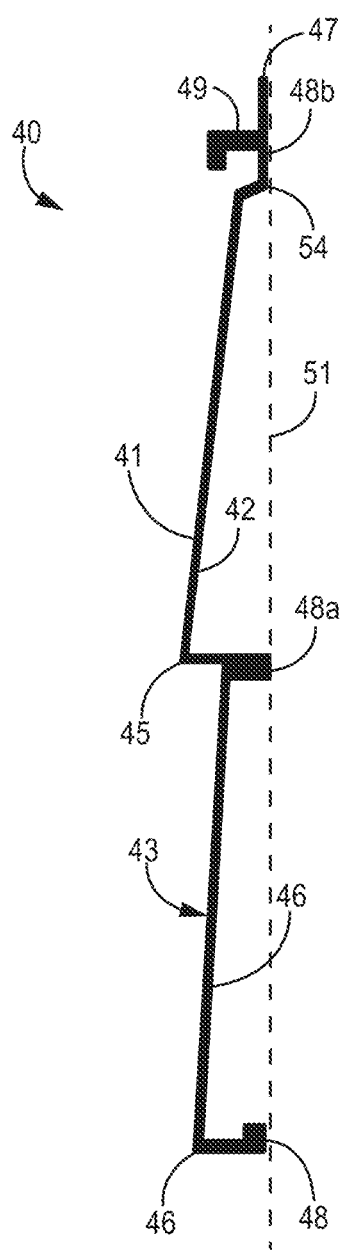
FIG. 2 is a side view of another aspect of the panel siding structure as claimed.

FIG. 2 is a side cross sectional view of an aspect panel as claimed. FIG. 1 shows a cross-sectional side view of another aspect of a thinner siding structure. The siding structure 40 has improved thermal properties because of the combination of unique elements. The siding structure 40 combines the appearance of conventional siding materials, structural integrity, thermal integrity in a single unit that can be installed on a rough exterior 51 in both real estate and commercial architecture. The siding structure 40 in this view, can take the appearance of overlapped cedar shake siding or a conventional clapboard siding depending on the view of the siding structure 40 from its appearance side. The thicker aspect of this aspect is found in the portion 54 and the length of the siding from 46 to 48 adding thickness compared to FIG. 1.

The siding structure 40, contains a front elevation 41 and 43 that is introduced into the siding structure 40 to mimic wood grain of a clapboard siding, overlapping shingles siding or stone siding as needed.

Front elevation 41 and 43 can have formed in its surface wood grain characteristics (not shown), the appearance of stained natural wood or uniformly covered or varied stone colors and exterior profiles. The siding structure 40 further contains a reverse elevation 42 and 44, which is typically produced without substantial In the installation of a siding structure 40 onto a rough exterior (not shown), the siding structure 40 is first placed on the rough exterior and then secured using fasteners that can be directed through the top attachment nailing flange, 47. While this flange is commonly called a nailing flange, any useful fastener that fits the flange apertures can be used in securing the siding structure 40 onto the rough surface using the flange 47.

Once placed on a rough exterior, additional siding structures can be added to the siding structure that has been secured on the rough surface using top and bottom continuation flanges 48 and 49.

At opposite ends of the panel 40 are right and left installation loci (not shown) that can be used to form a continuous surface of two or more of the siding structures in a side by side orientation. The use of the composite as claimed provides a stable thermal performance that minimizes any distortion of the edges that can expose the joinder of the panels.

Figure 3:
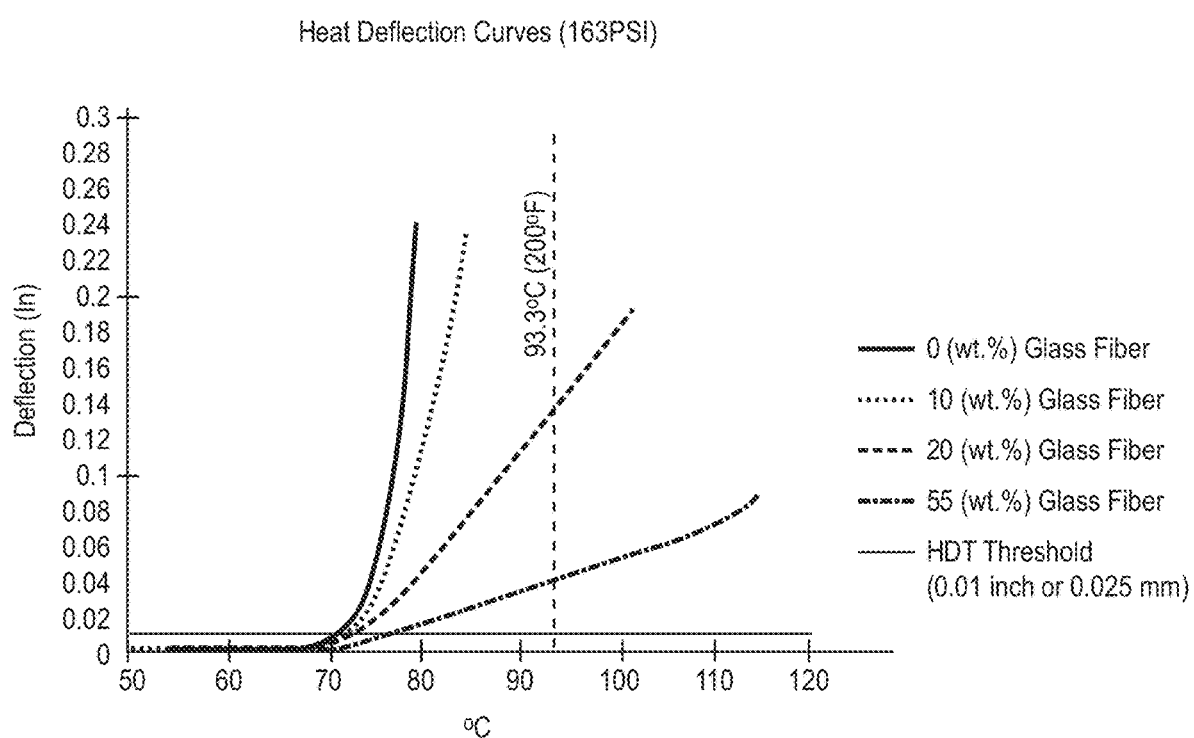
FIGS. 3 and 4 is a graphical representations of the heat deflection characteristics of the materials claimed in a range of glass fiber content form 10 wt. % to 55 wt. %. This is an indication of the thermal dimensional stability of the materials in use on residential and commercial construction.
Figure 4:
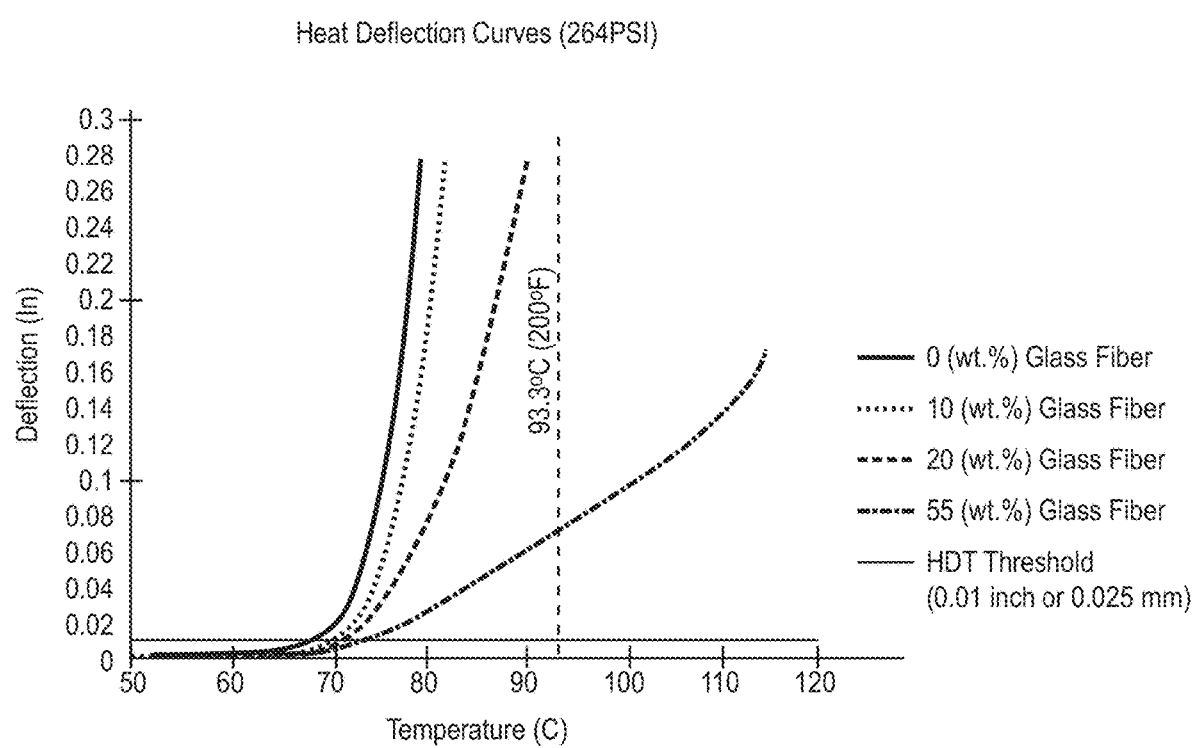

FIGS. 3 and 4 are graphical representations of the heat deflection characteristics of the materials claimed in a range of glass fiber content form 10 wt. % to 55 wt. %. This is an indication of the thermal dimensional stability of the materials in use on residential and commercial construction. FIGS. 3 and 4 show the heat deflection characteristics of the composite material. In FIG. 3 the data is taken using a substantial amount of pressure at 163 pounds per square inch, while FIG. 4 is run at a substantially higher pressure, 264 PSI. These show that the preferred materials have a heat distortion temperature that should be less than 0.01 inches in deflection. The data shows that in a polymer only (0% glass fiber), the thermoplastic polymer fails the test at just over 70° C. While the 55% glass fiber composite does not fail until the temperature reaches approximately 83° C., in the 163 PSI test. While in FIG. 4 the heat deflection at higher pressures reduce the temperature, the performance of the high concentration glass fiber composites is acceptable and is greater than 70° C.

Figure 5:
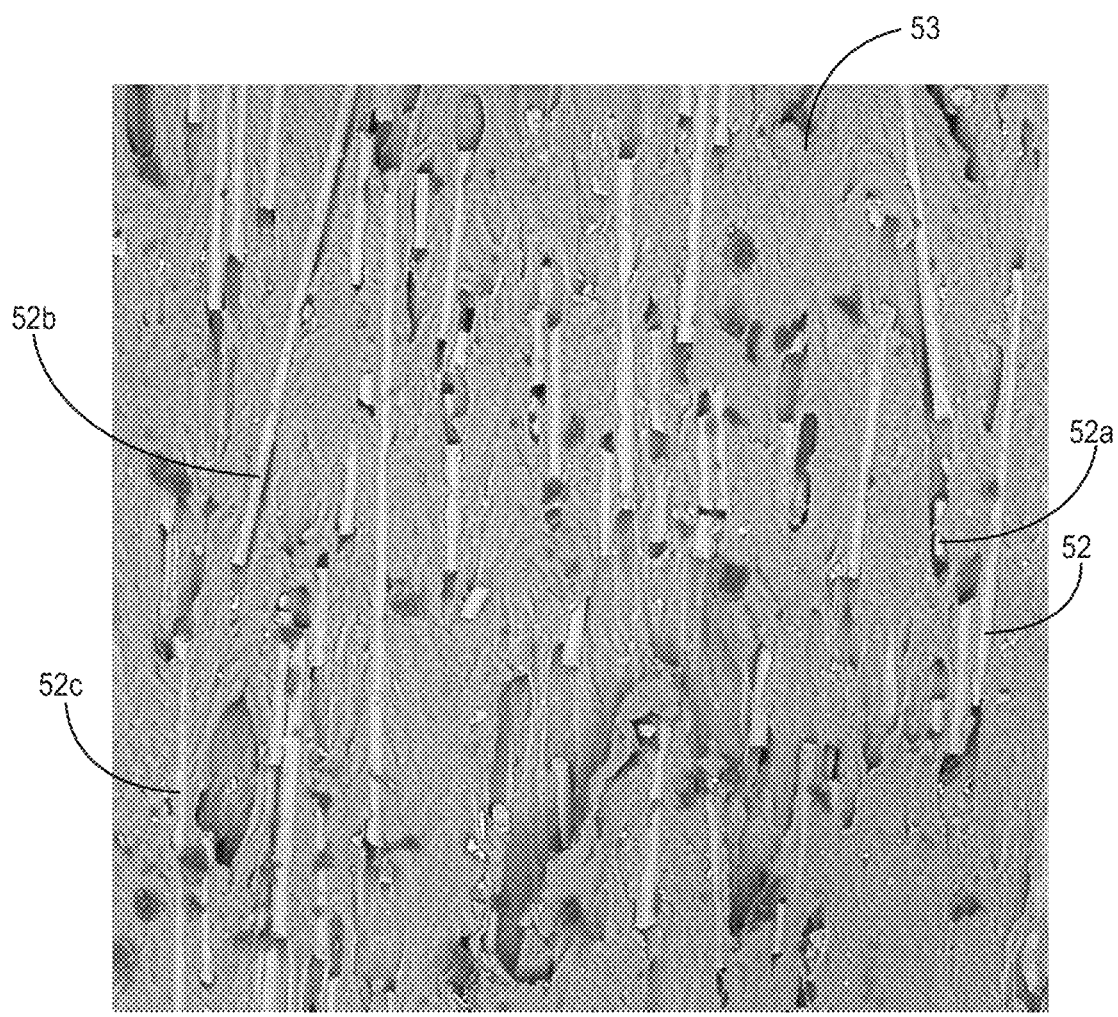
FIG. 5 is a photomicrograph of the composite as claimed.

FIG. 5 is a photomicrograph of the composite showing the glass fibers wetted, dispersed and aligned in the polymer matrix. The alignment is in the extrusion direction. The nature of the polymer wetting relates to the IM coating. Glass fiber surfaces are typically not easily wetable by polymer due to the surface energy of glass and sizing. The photomicrograph shows polymer matrix 53 and glass fibers 52, 52a, 52b, 52c. Fiber 52 is a fiber of moderate length and with peripheral wetting of polymer on the fiber. Fiber 52a is a shorter fiber. Fiber 52b is a longer fiber that is wetted by the polymer due to the IM. Fiber 52c has a fiber length like fiber 52 and polymer wetting to the IM coating on the fiber.

FIG. 6-8 are graphical representations of Izod impact strength (Izod), coefficient of thermal expansion (COTE) and heat deflection temperature (HDT).

TABLE 3

Figures Reference numbering

| | Detail | Feature |
|---|---|---|
| FIGS. 1, 2 and 5- Reference Number | | |
| 40 | Siding panel structure | Combines appearance structure and thermal stability in a single unit |
| 41, 43 | Front elevation | Can have graining or other profile |
| 42, 44 | Reverse elevation | Attachment location for panel |
| 45, 46, 54 | Decorative Edge | Decorative edges and front elevations provide a pleasing appearance of a conventional siding structure |
| 47 | Top attachment nailing flange | Used in nailing siding to rough exterior |
| 48 48a 48b | Bottom attachment | Edge 48 cooperates with |

TABLE 3-continued

Figures Reference numbering

| | Detail | Feature |
|---|---|---|
| | edge held in place by continuation flange | attachment 49 to obtain rigid installation of two or more courses of siding. Edge 48 48a and 48b cooperate to permit secure installation against the rough surface. 51. |
| 49 | Continuation Flange | 48 cooperates with 49 to obtain rigid installation of two or more courses of siding. |

FIG. 5 - Reference Number

| | | |
|---|---|---|
| 51 a, c | Panel installation surface | Installation surfaces cooperate to provide a planar surface on the reverse of the structure |
| 51 b | Composite Panel installation surface | |
| 53 | Polymer matrix | |
| 52 52a 52b 52c | Glass fiber | |

The claims may suitably comprise, consist of, or consist essentially of, or be substantially free or free of any of the disclosed or recited elements. The claimed technology is illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims.

The specification shows an enabling disclosure of the composite technology, other embodiments may be made with the claimed materials. Accordingly, the invention is embodied solely in the claims hereinafter appended.

We claim:

1. A siding assembly comprising the profile comprising: (i) a top edge comprising a nailing flange and a bottom edge, (ii) an exterior face and a reverse face, and (iii) a right and a left installation locus; wherein the panel comprises a composite comprising a continuous thermoplastic polymer phase and a discontinuous glass fiber phase dispersed in the polymer, the composite comprising: (i) the continuous polymer phase comprising the thermoplastic polymer; and (ii) about 1 to 60 wt. % of the glass fiber, the fiber having a length greater than about 5 microns, a diameter greater than about 3 microns and an aspect ratio greater than about 3, the fiber having about 0.1 to 5 wt. % of an exterior coating comprising an interfacial modifier, the wt. % based on the discontinuous glass fiber phase; and wherein the assembly has an impact (ASTM D4226) of at least 4 Joules, an R (insulation) value of at least 2 (ASTM C1363), a heat deflection temperature of at least 60° C. (ASTM D648), and a coefficient of thermal expansion (COTE) of less than $20 \times 10^{-6}$ in·in$^{-1}$° F. (ASTM 696).

2. The panel of claim 1 wherein the polymer comprises a polyvinyl chloride.

3. The panel of claim 1 wherein the interfacial modifier is an organometallic compound.

4. The panel of claim 1 wherein the assembly has an impact (ASTM A3746) of at least 30 Joules, composite has a heat deflection temperature of at least 60° C. (ASTM D648), and a COTE less than $10 \times 10^{-6}$ in·in$^{-1}$° F. (ASTM 696).

5. The panel of claim 1 wherein the panel comprises a wood grained appearance.

6. The composite of claim 1 wherein the composite comprises about 0.1 to 3 wt.-% of an interfacial modifier.

7. The composite of claim 1 wherein the organometallic interfacial modifier comprises a titanate compound.

8. The composite of claim 1 wherein the exterior coating comprises a continuous layer having a thickness of about 100 to 1500 A.

9. The composite of claim 1 wherein the organometallic interfacial modifier is free of any reactive coupling agent.

10. The top edge of claim 1 comprising a nailing flange and the bottom edge comprising a coupling member that can provide mechanical attachment to additional panels.

\* \* \* \* \*